United States Patent [19]

Bohn

[11] Patent Number: 4,868,708
[45] Date of Patent: Sep. 19, 1989

[54] METHOD FOR VOLTAGE CONTROL OF THE MAGNETS OF A MAGNETICALLY LEVITATED RAILROAD AND ASSOCIATED CONTROL UNIT

[75] Inventor: Gerhard Bohn, Munich, Fed. Rep. of Germany

[73] Assignee: Messerschmitt-Bolkow-Blohm GmbH, Munich, Fed. Rep. of Germany

[21] Appl. No.: 76,676

[22] Filed: Jul. 23, 1987

[30] Foreign Application Priority Data

Jul. 23, 1986 [DE] Fed. Rep. of Germany ....... 3624903

[51] Int. Cl.$^4$ .............................................. B61B 13/08
[52] U.S. Cl. .................................... 361/144; 104/284; 318/135
[58] Field of Search ............... 310/90.5; 104/284, 281, 104/282, 293; 361/144; 318/135

[56] References Cited

U.S. PATENT DOCUMENTS 4,505,206  3/1985  Gottzein .............................. 104/284

FOREIGN PATENT DOCUMENTS 2446936  4/1976  Fed. Rep. of Germany .
3117971  6/1984  Fed. Rep. of Germany .
3501487  7/1986  Fed. Rep. of Germany .
3513816 10/1986  Fed. Rep. of Germany ...... 104/284
3411190 11/1986  Fed. Rep. of Germany .
3515350  5/1987  Fed. Rep. of Germany .

OTHER PUBLICATIONS

[Introduction to the Theory of Observer Units, Regulation Technology] "Regelungstechnik, Einfuehrung in die Theorie der Beobachter", J. Ackermann, Issue 7, 1976, pp. 217–226.
[Regulation of an Electromagnetic Levitating Vehicle with Integrated Drive-, "Regelung Eines Elektromagnetischen Schwebefahrzeuges Mit Integriertem An-Support & Guidance System, Reg. Tech., 1978, Issue 8, pp. 258–265] Triebs, Trag-und Fuehrungssystem", W. Vollstedt & G. Kaupert, Regelungstechnik.
[Appln. of the Magnetic Wheel in High Speed Magnetic Levitation Trains] "Anwendung des Magnetischen Rades in Hochgeschwindigkeitsmagnetschwebebahnen" W. Gottzein et al., ZEV-GLAS. Ann 103, 1979, No. 5, pp. 227–232.

Primary Examiner—Michael L. Gellner
Assistant Examiner—David M. Gray
Attorney, Agent, or Firm—Toren, McGeady & Associates

[57] ABSTRACT

A method for controlling a magnet of a magnetically levitated railroad, wherein at least three variables are used which are acquired in an observer unit (support circuit) based on the measured magnitudes for the magnetic gap width s, as well as the magnetic acceleration b; to improve the following behavior of the magnetically levitated vehicle without increasing the background noise component, an additional rail signal is feed to the controller of the individual magnets, which rail signal is respectively obtained by a rail observer unit from the measured magnitudes of the magnet gap width and the magnet acceleration of one of the magnets which is leading in a travel direction in such a way that it represents a noiseless rail signal with a correct phase in the useful frequency range as referred to the respectively trailing magnets.

12 Claims, 9 Drawing Sheets

METHOD FOR VOLTAGE CONTROL OF THE MAGNETS OF A MAGNETICALLY LEVITATED RAILROAD AND ASSOCIATED CONTROL UNIT

FIELD AND BACKGROUND OF THE INVENTION

The invention is directed to a control method for regulation of the magnets of a magnetically levitated railroad, with the use of at least three variables, which are acquired in an observer unit (support circuit) based on the measured magnitudes for the magnet gap width s as well as the magnet acceleration b, as well as an associated control unit.

Such a method is known from the DE-A1 35 01 487. There a control loop for a magnetically levitated vehicle is described, which is guided along a track by controlled support- and guidance magnets. The control loop comprises an observer unit designated as a support circuit or support loop, which is fed by the magnet acceleration b in the direction of the magnetic attraction force, as well as the magnet gap width s by way of measured magnitudes. The support loop forms three variable magnitudes in the form of estimated values for the magnet gap width, the gap change velocity as well as the magnet acceleration with the help of summation or adding links, integrators and amplifier links. Theseestimated values are respectively fed to an amplifier or gain link, whose three output values are fed to an additional summation member, from which finally the control unit output signal can be derived. In general, such control loops are used in order to enable a stable levitation of the magnetic vehicle during standstill and a good following behavior at all traveling speeds. In the voltage control method described in the DE-A1 35 01 487 it is essentially intended to maintain the stability of the vehicle in a simple manner also when levitating at standstill. It is provided there for that reason to assign an adaptive rail observation unit to each support magnet, which is matched to the track vibrations, and which generates an adaptive signal, which is superimposed to the control loop of the same support magnet.

Figure 1:
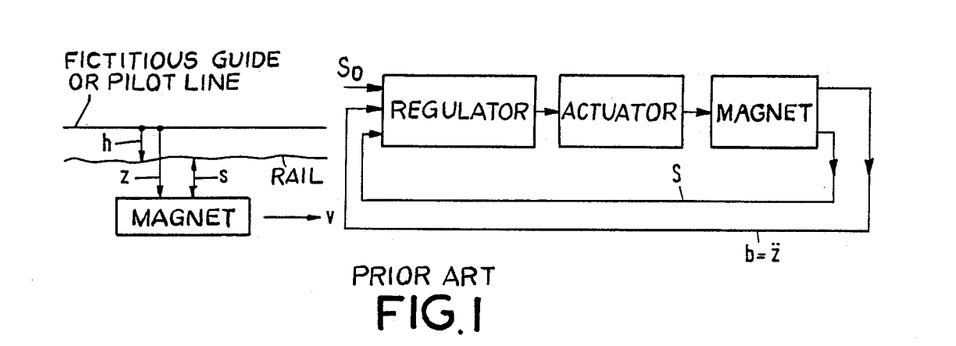
FIG. 1 is a block diagram of a control loop.

A control loop for an magnet elastically suspended at the levitating chassis—a magnetic wheel—has the form depicted in FIG. 1: herein the symbols mean:
- v: traveling speed
- $b = \ddot{z}$ (z: magnet coordinate)
- $s = z - h$ (h: rail coordinate)
- $s_o$: required magnet gap
- h and z are defined with respect to a fictitious inertial guide or pilot line.

The control unit utilizes signals which are measured directly at the location of the magnet, this being the object to be control. In order to assure the stability of a magnetic wheel in the course of voltage control, three variables have to be fed back. These are for instance the values $\dot{s}$, $s'$ and $b = \ddot{z}$. Since $s'$ cannot be directly measured, this value is at least determined as an estimated value s from a reduced observer unit. Since the set of the three state variables thus obtained does not yet assure a sufficient following behavior, it is desirable to design the observer unit in such a way that it also supplies an approximate $\hat{s} \approx s$.

The derivation of s or $\hat{s}$ from s and $\ddot{z}$ is always connected with a differentiation of the rail coordinate. Thus, for example, $\hat{s}$ can be represented in Laplace presentation by an observer of the first order as $$\hat{s} = pz - \frac{p}{1 + \tau p} \cdot h = pz - p\hat{h} \quad (1)$$

Thus in limiting cases there applies:

$$\hat{s} \stackrel{p \to 0}{=} \dot{s}$$

$$\hat{s} \stackrel{p \to \infty}{=} pz - \frac{1}{\tau} h.$$

An improvement of the differentation (smaller $\tau$) yields thus a high noise component because of high frequency rail disturbances, which must no longer be followed. This noise component can lead to instabilities because of the natural limits of the actuator. In case of a real guideway, which must be economical because of reasons of cost, there will thus always exist tolerances, which result in a high background noise component. From (1) one recognizes further that one does not have a following system or follow-up for the rail $h_{(f)}$, rather for the rail contour $$\hat{h} = \frac{1}{1 + \tau p} h$$

Even in case of a hard coupling to $\hat{h}$ there result thus changes in the gap because of the phase between h and $\hat{h}$.

It follows from the above explanations that the rail tolerances permit only a minimum value of $\tau$ and thus a limited estimation of $\hat{h}$, with this however they determine the optimum following or follow-up behaviour and with this the required air gap.

SUMMARY OF THE INVENTION

The invention is based upon the task to propose a method of the previously described type, with which the following or follow-up behavior of the magnetically levitated vehicle is improved, without increasing the background noise component. Furthermore, a control unit is to be designed which is suitable for performing this method.

This task is solved in the invention in that a rail signal is additionally fed to the controllers of the individual magnets (j), which is respectively obtained by a rail observer unit from the measured values a and b of one of the magnets (j—k) which is leading viewed in travel direction in such a way, that it represents a noiseless rail signal with a correct phase in the useful frequency range as referred to the respectively trailing magnets.

The first magnet of the vehicle must be controlled conventionally, however, the folllwing behavior can also be improved by a softer suspension to the chassis. It is also conceivable, that the signals s and b are determined upstream of the first magnet at a point of the levitating or floating chassis and that from this a rail signal for the first magnet is processed. This applies in principle also for the remaining magnets.

Methods are indicated in subclaims, which represent further expedient embodiment forms of the invention.

A control unit for performing the method in the invention will, to begin with, contain at least one control loop circuit arrangement for each magnet, which corresponds to the control loop (see there FIG. 1) described in the DE-A1 35 01 487 as far as its structure is concerned. Thus, the control loop circuit arrangement is to contain the following components: a first summation member for addition of the measured value b and of a first feedback signal, an integrator downstream of the first summation member, a second summation member adding the output signal of the first integrator and a second feedback signal, a second integrator downstream of said summation member, as well as a third summation member subtracting the output signal of the second integrator from the measured value s, from the output signal of said summation member the two feedback signals are formed after multiplication of the factors depending on the cutoff frequency of the support loop. In accordance with the invention each magnet (j—k) is furthermore to be assigned at least one rail observer-circuit arrangement, whose construction is identical to that of the control loop circuit arrangement, whose feedback signals are formed by multiplication with factors, which are a function of the speed dependent cutoff frequency $\omega_v = 2vD_v/\Delta x$ and whose first feedback signal is feedable as a rail signal u to a trailing magnet (j).

Expedient embodiment forms of such a controller are described in additional subclaims.

BRIEF DESCRIPTION OF THE DRAWINGS

In the following the invention will be described with particularity in the form of two embodiment examples with the help of drawings. It is shown schematically on.

DESCRIPTION OF THE PREFERRED EMBODIMENTS

Figure 2:
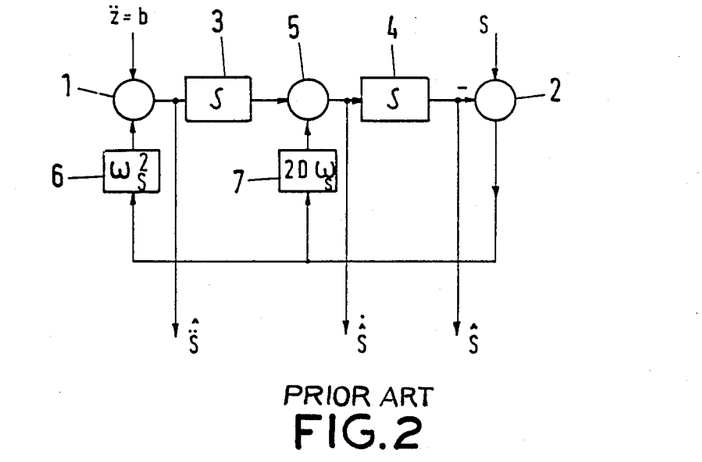
FIG. 2 a state of the art control loop or circuit.

The known support circuit in FIG. 2 contains a first summation member 1, which is fed by the measured value b as well as a first feedback signal, and whose output signal arrives at the input of a first integrator 3. The output signal of said integrator is supplied together with a second feedback signal to a second summation member 5, which is again wired upstream of a second integrator 4. The output signal of said second integrator reaches together with the measured value s a third summation member 2, where it is subtracted from the measured value s. The first or second feedback signals for the summation members 1 and 5 are derived from the output signal of the summation member 2 after multiplication by the factors $\omega_s^2$ or $2D\omega_s$ in the amplification or gain members 6 or 7. The three estimated values $\hat{s}, \dot{\hat{s}}$ and $\ddot{\hat{s}}$ for the magnetic gap width as well as its first and second derivatives with respect to time are extracted from the support loop as depicted in FIG. 2. $\omega_s$ represents the cutoff frequency and D the damping constant of the support loop.

The following expressions are calculated for the three estimated values from FIG. 2, wherein p represents the Laplace differential operator:

$$\begin{aligned}
\hat{s} &= z - \frac{\omega_s^2 + 2D\omega_s p}{\omega_s^2 + 2D\omega_s p + p^2} h = z - \hat{h} \\
\dot{\hat{s}} &= p\hat{s} = \dot{z} - \dot{\hat{h}} \\
\ddot{\hat{s}} &= \ddot{z} - \frac{\omega_s^2}{\omega_s^2 + 2D\omega_s p + p^2} \ddot{h} = \ddot{z} - \ddot{\hat{h}}
\end{aligned} \quad (2)$$

It follows from this for low or high frequencies, respectively:

$$\left.\begin{aligned}
\hat{s} &\xrightarrow{p \to 0} s \\
\dot{\hat{s}} &\xrightarrow{p \to 0} \dot{s} \\
\ddot{\hat{s}} &\xrightarrow{p \to 0} \ddot{s}
\end{aligned}\right\} \quad (3)$$

$$\left.\begin{aligned}
\hat{s} &\xrightarrow{p \to \infty} z \quad \hat{h} \to 0 \\
\dot{\hat{s}} &\xrightarrow{p \to \infty} \dot{z} \quad \dot{\hat{h}} \to 2D\omega_s h \\
\ddot{\hat{s}} &\xrightarrow{p \to \infty} \ddot{z} \quad \ddot{\hat{h}} \to \omega_s^2 h
\end{aligned}\right\} \quad (4)$$

It is seen from equation (4) that an increase of the support loop cutoff frequency increases the background noise in the rail component.

Figure 3:
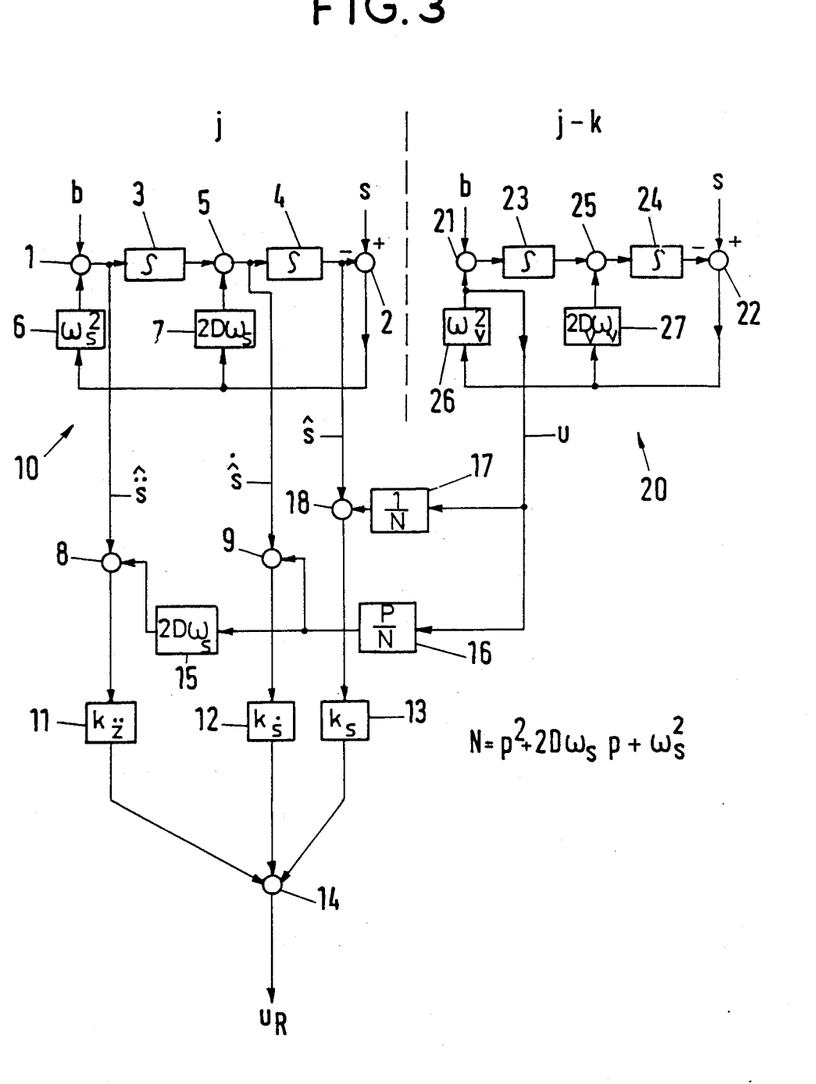
FIG. 3 a first controller unit in accordance with the invention.

FIG. 3 shows an embodiment form of the method in the invention or of a controller unit in the invention. To begin with a support loop 10 is shown for a magnet j trailing in traveling direction, which support corresponds to that in the FIG. 2. Thus the corresponding reference numbers have also been maintained. The estimated values $\hat{s}, \dot{\hat{s}}$ and $\ddot{\hat{s}}$, which can be gathered from the support loop 10, are fed to the summation members 18, 9 and 8, which respectively receive an additional addend. The output signals of the summation members 8, 9 as well as 18 reach by way of amplification or gain members 11, 12, 13, where a multiplication of the input signals with the entered factors occurs, an additional summation member 14 which finally at its output yields the controller output signal $u_R$.

Furthermore a rail observer is depicted in the FIG. 3, which pertains to a magnet j'k leading in traveling direction. The appropriate rail observer circuitry 20 equals that of the support circuit loop 10 as far as its structure is concerned. While, however, in the last named circuitry constant factors $\omega_s^2$ as well as $2D\omega_s$ are used in the amplification members 6 and 7, the factors in the corresponding amplification members 26 and 27 of the rail observer circuitry 20 are a function of the traveling speed v. The rail observer circuitry 20 contains as a matter of fact first, second and third summation members 21, 25 as well as 22 and two integrators 23, 24 analogous to the support circuit circuitry 10. The output signal of the amplification member 26 is fed as a rail signal u to the controller unit of the associated trailing magnet j. Herein additionally three amplification members 15, 16 and 17 are respectively wired-in as depicted in FIG. 3, in which the rail signal u is multiplied with the depicted factors for generation of the addends which have to be fed to the summation members 18, 9 as well as 8.

The rail signal u has the following form as can be easily calculated:

$$u = -\frac{\omega_v^2}{p^2 + 2D\omega_v p + \omega_v^2} p^2 h$$

Herein $\omega_v$ is given by:

$$\omega_v = \frac{2D_v}{\tau_k} = \frac{2D_v}{\Delta x} v$$

Herein $\Delta x = x_{j-k} - x_j$ mean the distance between the magnets j—k and j, v the traveling speed, $\tau_k$ thus the time interval, by which the trailing magnet j lags the leading magnet j—k, as well as $D_v$ the damping constant of the rail observer.

Thus a factor $\omega_v$ depending on the speed is selected in the amplification members 26 and 27.

For the signal $u_{j-k}$ from a leading magnet j—k, which "sees" the rail sooner by the time interval $\tau_k$ compared to the magnet j the following holds:

$$u_{j-k} = -p^2 \frac{\omega_s^2}{p^2 + 2D\omega_s p + \omega_s^2} h_{j-k}$$

$$= -p^2 \frac{\omega_s^2}{p^2 + 2D\omega_s p + \omega_s^2} e^{\tau_k p} h_j$$

The e-factor expresses, that there exists a shift timewise between the rail signals $h_{j-k}$ at the location of the magnet j—k and $h_j$ at the location of the magnet j, said shift being a function of the traveling speed v. If now $\omega_s$ in the rail observer circuitry 20 of the magnets j—k is chosen in such a way that the following applies:

$$\omega_s = \omega_v$$

Then the rail signal $u_{j-k}$ for the magnet j in the range $/p/<\omega_v$ represents a non-delayed, however filtered signal $-\ddot{h}$ for $-\ddot{h}$.

So that this remains valid for all speeds, the frequency $\omega_v$ must be changed corresponding to the traveling speed v.

A speed signal generated in a decentralized manner is advisable here for reasons of safety, such as it is proposed in the German Pat. No. 34 11 190 as well as the patent application P 35 15 350.4-32.

The rail portions in equation (2), measuring the estimated value h as well as its derivatives can be corrected with this signal h free of background noise. In the equation for $\hat{s}$ compared to s the following share is missing:

$$-p^2 \frac{1}{\omega_s^2 + 2D\omega_s p + p^2} h = -\frac{1}{\omega_s^2 + 2D\omega_s p + p^2} \ddot{h}$$

If one substitutes $\hat{h}$ for $\ddot{h}$ in this expression and adds it to h, then one gets $$h^* = \hat{h} + \frac{p^2}{\omega_s^2 + 2D\omega_s p + p^2} \cdot \frac{\omega_v^2}{\omega_v^2 + 2D\omega_v p + p^2} e^{\tau_k p} h$$

$$= \hat{h} + \frac{1}{\omega_s^2 + 2D\omega_s p + p^2} \tilde{\ddot{h}}$$

A correction free of noise for $\dot{\hat{h}}$ results from $$\dot{h}^* = \dot{\hat{h}} + \frac{p}{\omega_s^2 + 2D\omega_s p + p^2} \tilde{\ddot{h}}$$

and an improvement for h is given by $$\ddot{h}^* = \ddot{\hat{h}} + \frac{2D\omega_s p}{\omega_s^2 + 2D\omega_s p + p^2} \tilde{\ddot{h}}$$

In order to thus correct the estimated values $\hat{s}$ including the derivatives with respect to time according to equation (2), the expressions indicated above are added to the estimated values h including the derivatives for the rail coordinate with respect to time. From this it is seen that as depicted in FIG. 3 the rail signal u from the rail observer circuitry 20 is to be multiplied by the factor 1/N for correction of $\hat{s}$, by the factor p/N for correction of $\hat{s}$ and by the factor $2D\omega_s p/N$ for correction of s, where $N=\omega_s^2+2D\omega_s p+p^2$.

Figure 4:
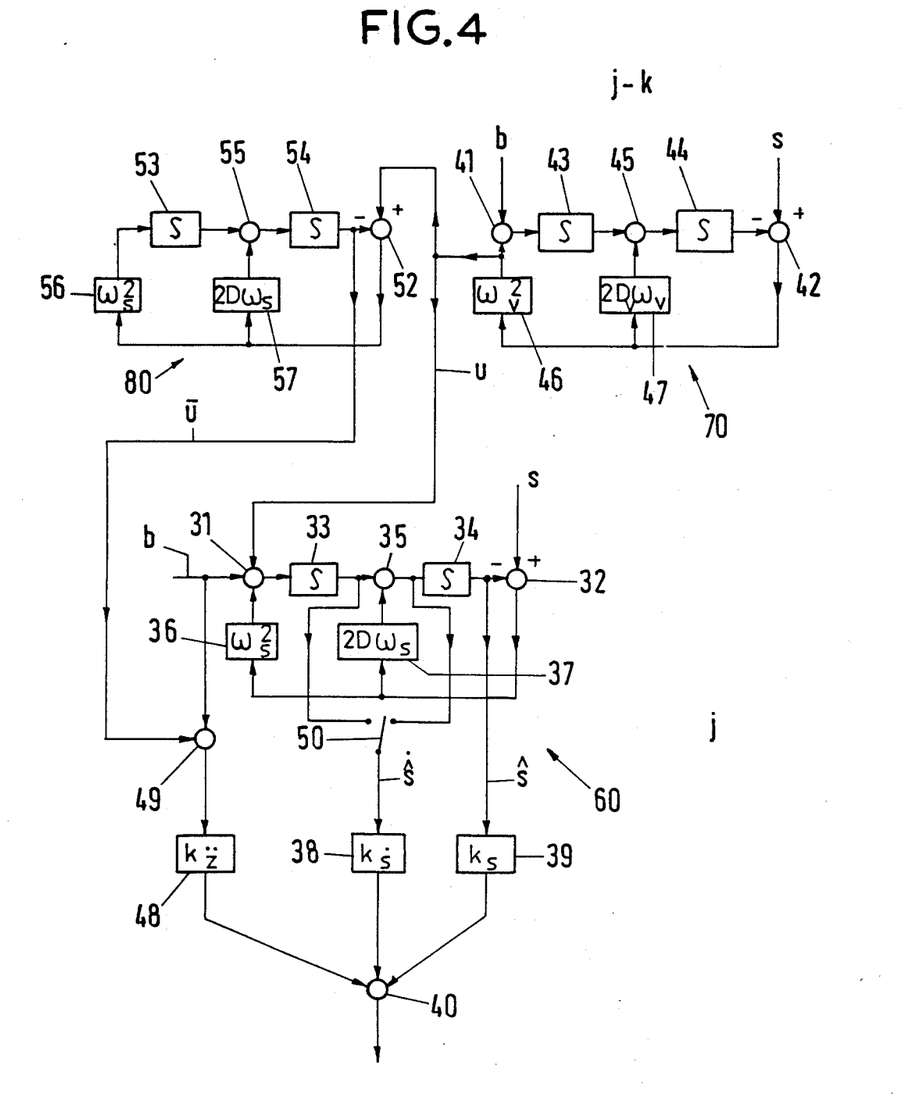
FIG. 4 an additional controller unit in accordance with the invention.

FIG. 4 represents an additional possibility to feed a rail signal u to the controller of the magnet j, which is obtained from the measured values s and b of a leading magnet j—k as viewed in traveling direction. The index v characterizes here again the leading magnet, the index s the trailing magnet which is to be controlled. The symbolism and the designations are selected to be analogous with the FIGS. 2 and 3. The switch 50 affords the possibility of switching from a position applying for standstill and traveling with very little background noise to a noise-free position for traveling (the left hand switch position).

A more detailed computational investigation of the controller unit in FIG. 4 shows that there the signals s and s are exactly equal to the output signals of the summation members 18 and 19 in the FIG. 3. The same applies for the output signals of the summation member 49 in FIG. 4 as well as of the summation member 8 in FIG. 3. As can be easily calculated with the help of the construction of the additional observer unit 80, there results as a correlation between the additional signal $\bar{u}$ and the rail signal $\bar{u}$:

$$\bar{u} = -\frac{2D\omega_s p + \omega_s^2}{N} \cdot \frac{\omega_v^2}{N_v} \tilde{h} = \frac{2D\omega_s p + \omega_s^2}{N} u$$

$$N_v = \omega_v^2 + 2D\omega_v p + p^2.$$

Figure 5:
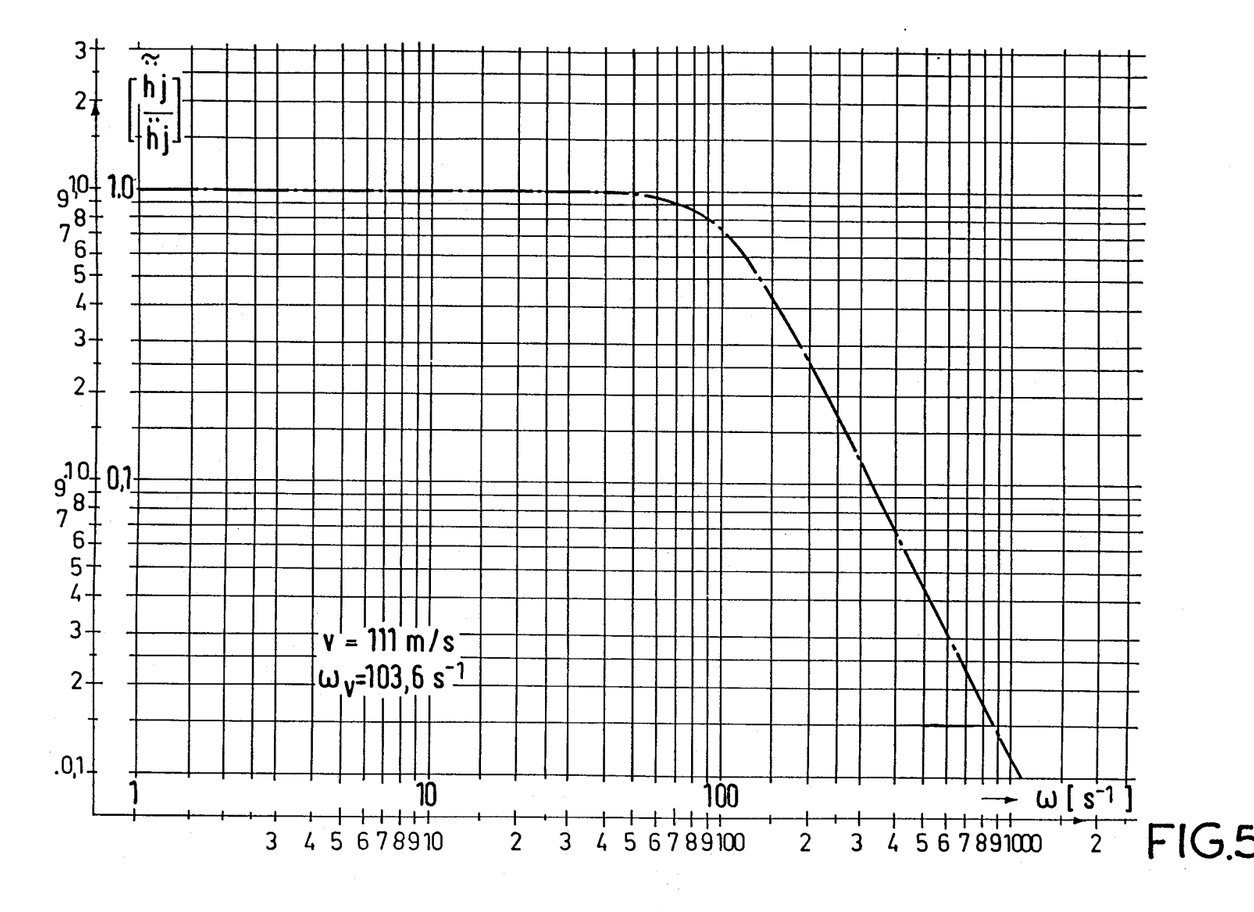
FIGS. 5–10 the amplitude—and phase curves of different signals as a function of frequency.
Figure 6:
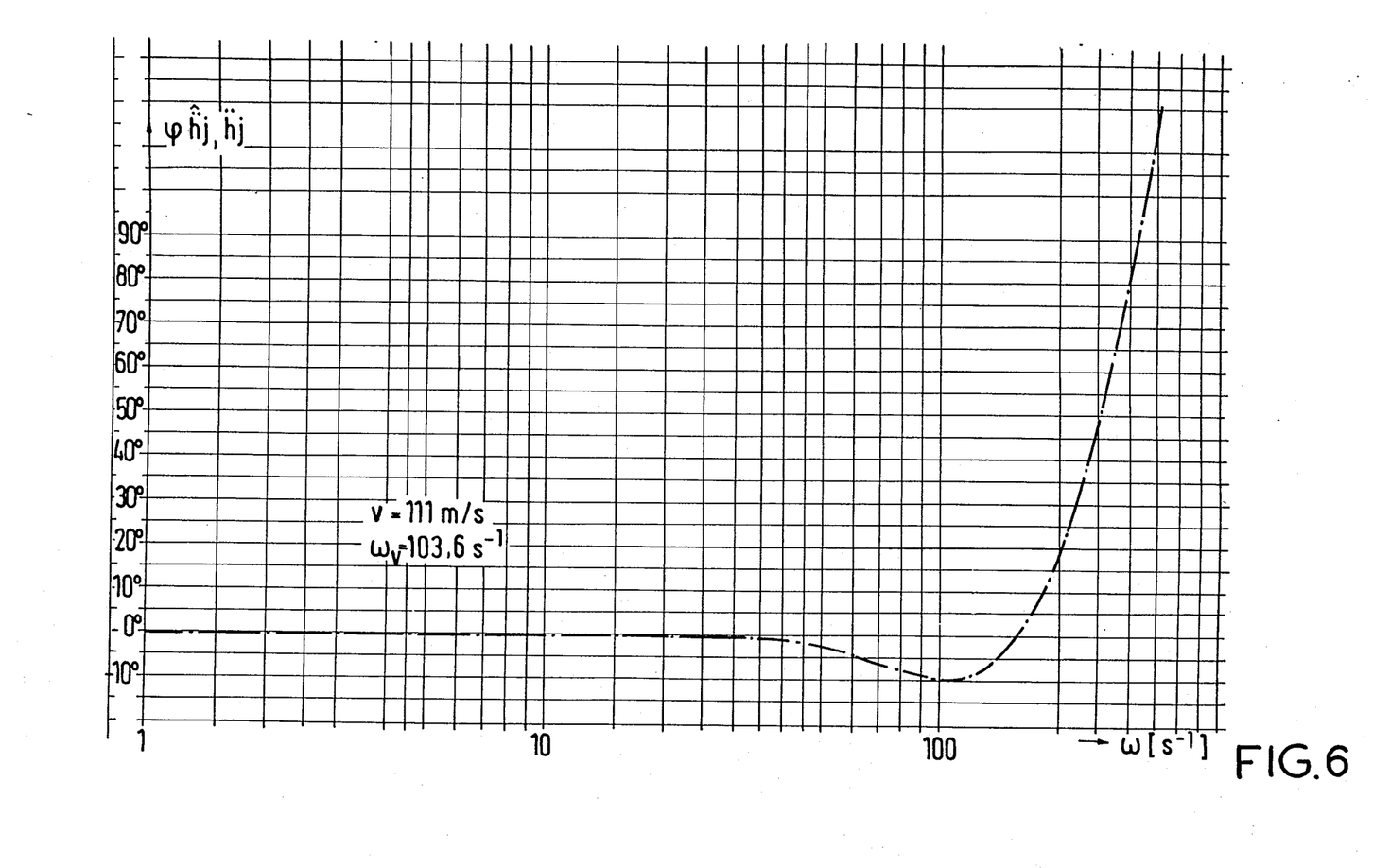
Figure 7:
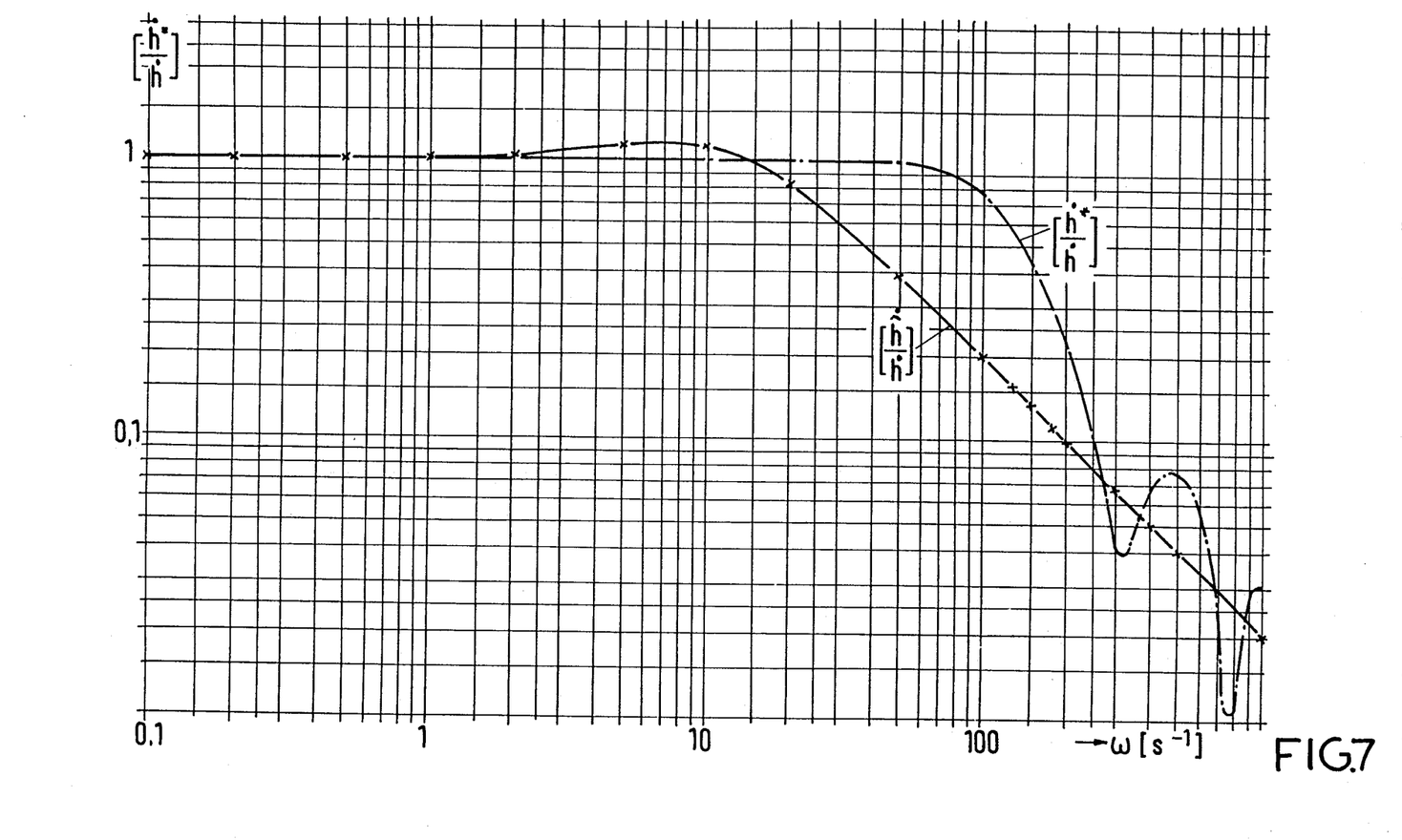
Figure 8:
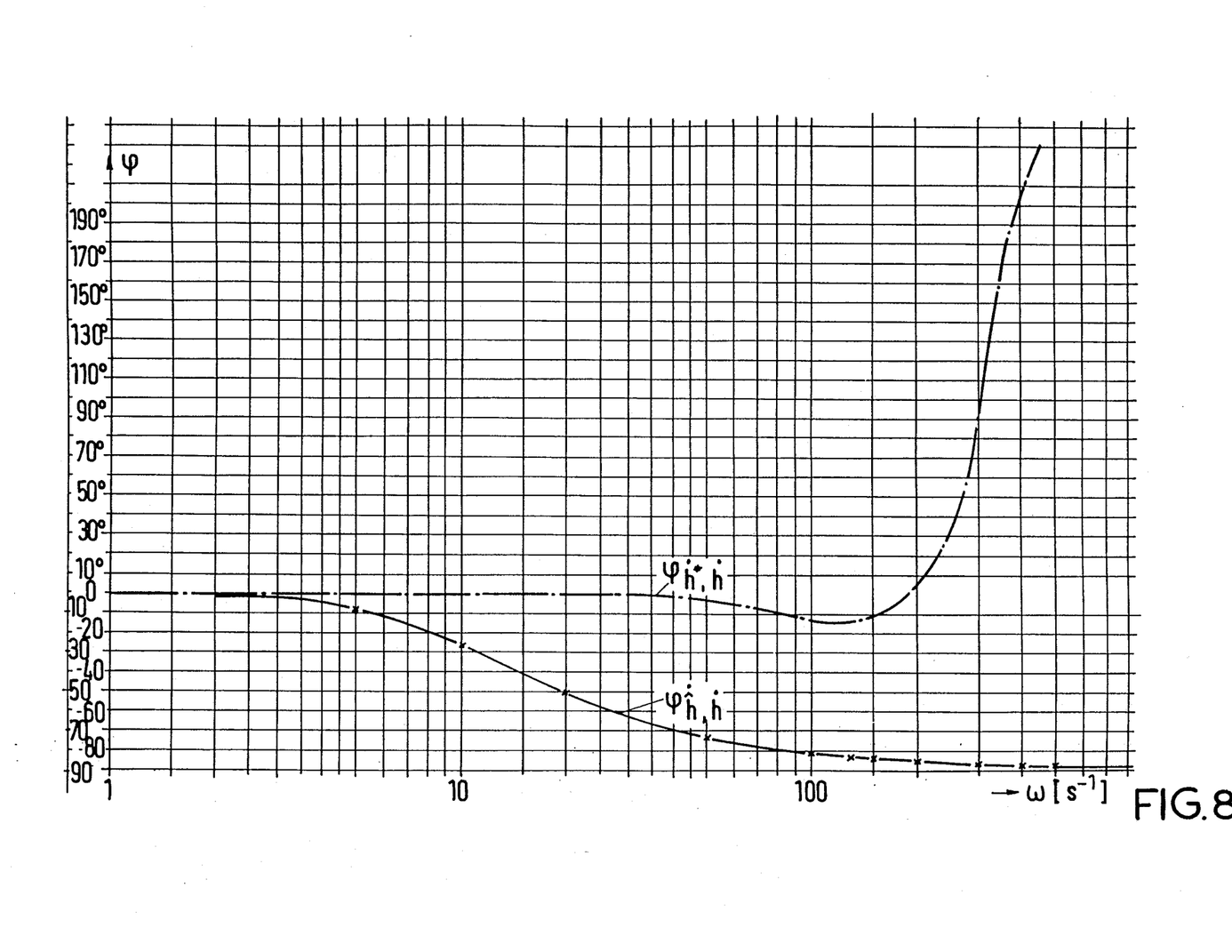
Figure 9:
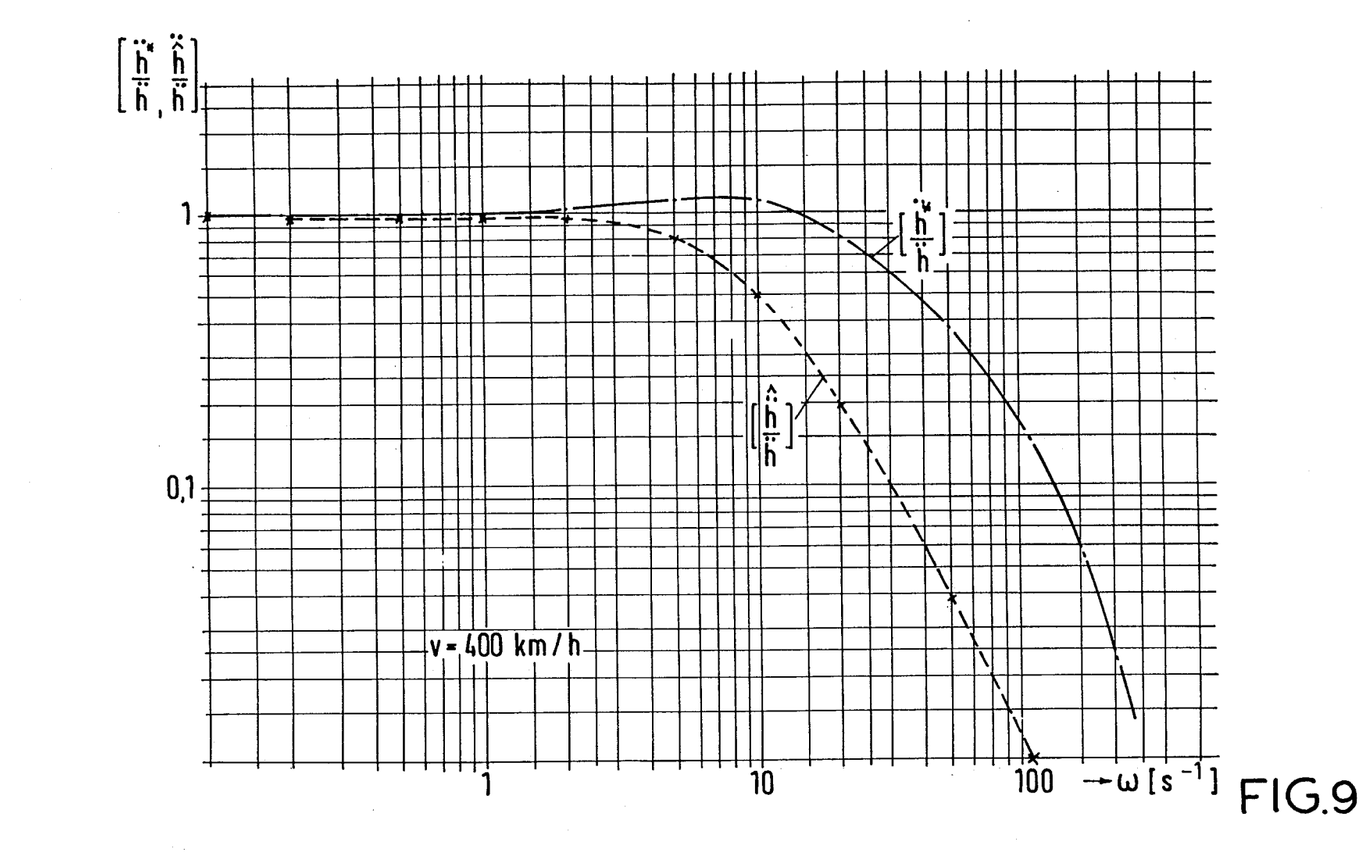
Figure 10:
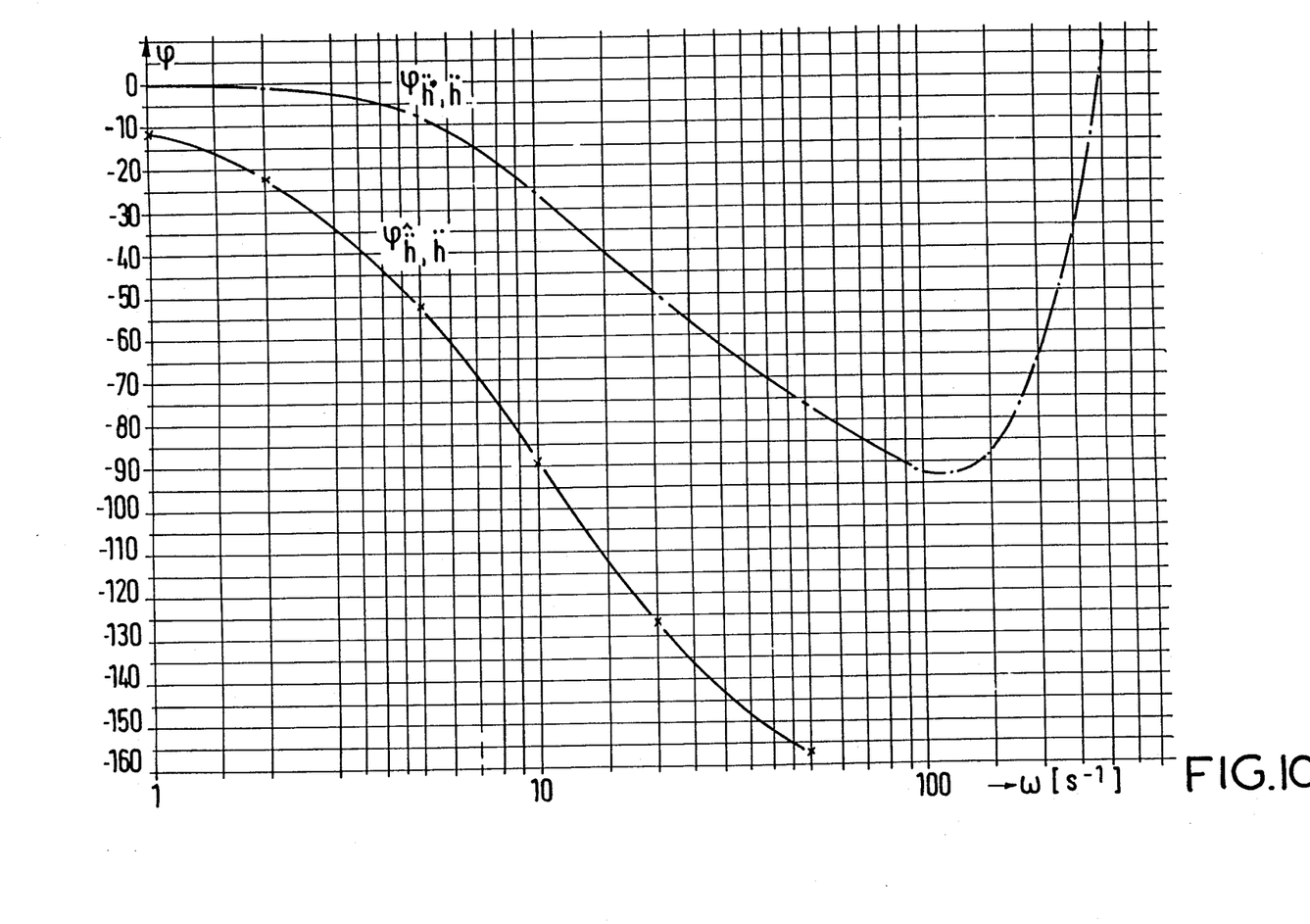

In FIGS. 5-10 diagrams are depicted, in which frequency dependence of the amplitude—and phase behavior of the approximate—and estimated magnitudes $h_j$, $h^*$, h, $h^*$ as well as $\dot{h}$ compared to the real values $h_j$ and $\dot{h}$ is shown. On the abscissa the respective angular frequency ω is inserted on a logarithmic scale. The FIG. 5 shows the amplitude behavior of the auxiliary value $h_j$ for the parametric values v=111 m/s as well as $\omega_v=103,6$ s$^{-1}$. FIG. 6 shows the phase difference between these two magnitudes. It is seen that the phase lag amounts to a maximum of 10° up to the cutoff frequency $\omega_v$ and that in the adjacent range the amplitude drops at the second order. FIG. 7 shows the amplitude behavior of the value h* improved in accordance with the invention compared to the estimated value h, both refer to the corresponding real magnitudes. It follows that the approximate magnitude h* improved in accordance with the invention approximates considerably better to the corresponding real value than the original estimated value ĥ in equation (2). This applies according to FIG. 8 also for the phase difference between the two approximate—or estimated values h* and ĥ on the one hand as well as the corresponding real values on the other hand. At least up to the cutoff frequency $\omega_v$ the approximate magnitude h* follows the corresponding real magnitude h as far as phase differences are concerned considerably better than the estimated magnitude ĥ. Corresponding behavior can be derived from FIGS. 9 and 10 for the approximate magnitude h* in relation to the estimated magnitudes ĥ. In all cases there thus results a considerably improved amplitude and phase behavior if approximate values given by the invention are utilized, which are formed from the rail signals of the rail observer circuitry of the respectively leading magnets.

The diagrams of the FIGS. 5–10 are based on the parametric magnitudes D=1, $\omega_s$=10 s$^{-1}$, $\Delta$x=1.5 m, $D_v$=0.7, v=400 km/h as well as $\omega_v$=103.6 s$^{-1}$.

In the standstill state $\omega_v$=0 that means the path of j—k is open toward k. During levitation at standstill all the advantages of the previous control concept apply. In addition, the invention which causes an improved following behavior, allows to further lower the value for $\omega_s$, for instance to $\omega_s$=5s$^{-1}$, whereby the levitation stability while standing is increased and background noise is reduced.

The concepts estimated value, support circuit as well as observer unit used in this paper are common in control technology, especially in the case of magnetic levitation vehicles, as can be gathered from the following publications:

DE—A1 24 46 936,
DE—C2 31 17 971,
DE—A1 35 01 487,

"Einführung in die Theorie der Beobachter" von J. Ackermann, Regelungstechnik, 1976, H. 7, S. 217–226 ["Introduction to the Theory of Observer Units" by J. Ackermann, Regulation Technology, 1976, Issue 7, pages 217-226];

"Regelung eines elektromagnetischen Schwebefahrzeuges mit integriertem Antriebs-, Trag- und Führungssystem" von W. Vollstedt u. G. Kaupert, Regelungstechnik, 1978, H. 8, s. 258–265 ["Regulation of an Electromagnetic Levitating Vehicle with Integrated Drive-, Support- and Guidance System" by W. Vollstedt and G. Kaupert, Regulation Technology, 1978, Issue 8, pages 258–265], "Anwendung des magnetischen Rades in Hochgeschwindigkeitsmagnetschwebebahnen", von W. Gottzein, R. Meisinger u. L. Miller, ZEV-Glas. Ann. 103, 1979, Nr. 5, S. 227–232 ["Application of the Magnetic Wheel in High Speed Magnetic Levitation Trains", by W. Gottzein, R. Meisinger and L. Miller, ZEV-Glas. Ann 103, 1979, No. 5, pages 227-232].

I claim:

1. Method for control of a magnet of a magnetically levitated railroad, wherein each individual magnet (j) has a controller which comprises an observer (10, 60) and which forms a controller output signal $u_R$ determining the voltage at a magnet coil from measured values of magnet gap width s and magnet acceleration b with determination of estimated values of magnet gap width ŝ, gap change velocity ṡ, and magnet acceleration s̈, comprising:

obtaining an additional rail signal u from a further rail observer (20, 70) and from the measured magnitudes of the magnet gap width s and the magnet acceleration b of one of the magnets (j—k) which are leading in a travel direction; and feeding the additional rail signal u to the controller of the individual magnet (j).

2. Method according to claim 1, characterized in that the rail signal u in the further rail observer unit (20, 70) are formed by multiplication of the difference s-ŝ by $\omega_v^2$ whereby $\omega_v$ is given by $\omega_v$=2v$D_v$/$\Delta$x and v is the magnet velocity in traveling direction, $D_v$ the damping constant of the further rail observer unit (20, 70) of the respectively leading magnet (j—k) as well as $\Delta_x$ the distance of the respective two magnets.

3. Method according to claim 2, characterized in that the rail signal u derived from a respectively leading magnet (j—k) is added to the measured value b for the support loop (60) of the magnet (j), that estimated values for ŝ and ṡ are obtained from the measured values b and s, that an estimated value for s̈ is formed by summation of the measured value b and an additional magnitude ū derived from the rail signal u and that the controller output signal $u_R$ is obtained by linear combination of the three estimated values.

4. Method according to claim 2, characterized in that addends derived respectively from the rail signal u of a leading magnet (j—k) are added to the estimated values of the magnet gap width ŝ, the gap change velocity ṡ and the magnet acceleration s̈ and that the controller output signal $u_R$ is obtained by a linear combination of the resulting sums.

5. Method according to claim 4, characterized in that the addends are derived by multiplication with the factors 1/N (for ŝ), p/N (for ṡ) and 2D$\omega_s$p/N (for s̈) from the rail signal wherein N=$p^2$+2/d$\omega_s$P+$\omega_s^2$, D is the damping constant and $\omega_s$ the cutoff frequency of the support loop (10) of the respectively trailing magnets (j) and p is the differential operator.

6. Method according to claim 3, characterized in that the additional magnitude ū is formed from the rail signal u and an additional observer unit (80) with multiplication by (2D$\omega_s$p+$\omega_s^2$)/N where N=$p^2$+2D$\omega_s$p+$\omega_s^2$.

7. Method according to claim 1, characterized in that the measured values b and s used for formation of the rail signal u are obtained at a vehicle point leading in traveling direction with respect to the magnet (j) to be regulated.

8. Control unit for generation of a controller output signal $u_R$ for controlling the magnets of a magnetic levitation railroad, wherein at least one support loop circuitry is assigned to each magnet, which contains a first summation member for addition of a measured value of the magnet acceleration b and a first feedback signal, an integrator downstream of the first summation member, a second summation member adding the output signal of said integrator as well as a second feedback signal, a second integrator downstream of said second summation member as well as a summation member subtracting the output signal of the second integrator from the measured value s, from whose output signal the two feedback signals are formed after multiplication by factors depending on the cutoff frequency $\omega_s$ of the support circuit, characterized in that at least one rail observer-circuitry (20, 70) is assigned to each magnet (j—k), whose structure is identical to that of the support loop circuitry (10, 60), whose feedback signals are formed by multiplication with factors which are a function of the speed dependent cutoff frequency $\omega_v = 2vD_v/\Delta x$ and whose first feedback signal is feedable as a rail signal u to a trailing magnet (j).

9. Control unit according to claim 8, with amplification members for receiving estimated values for the magnet gap width $\hat{s}$, the gap width change velocity $\hat{\dot{s}}$ and the magnet acceleration $\hat{\ddot{s}}$ obtainable from the support loop circuitry and a summation member receiving the output signals of the amplification members and supplying the controller output signal $u_R$ at the output, characterized in that, respectively, one additional summation member (8, 9, 18) is wired upstream of the amplification members (11, 12, 13), to which summation members addends derived from the rail signal of a leading magnet (j—k) in addition to the respective estimated value can be supplied.

10. Control unit according to claim 8, with amplification members for receiving estimated values for the magnet gap width $\hat{s}$ and the gap width change velocity $\hat{\dot{s}}$ obtainable from the support loop circuitry and a summation member receiving the output signals of the amplification members and supplying the controller output signal at the output, characterized in that a rail signal u formed in the rail observer circuitry (70) of a leading magnet (j—k) is additionally feedable to the first summation member (31).

11. Controller according to claim 10, including an additional summation member (49) to which the measured value of the magnet acceleration b and an additional signal u derived from the rail signal $\bar{u}$ can be fed, and which includes an additional amplifier member (48) switched downstream of said summation member (49) which on its output side is connected with the summation member (40) supplying the controller output signal $u_R$.

12. Controller according to claim 11, including, respectively, one additional observer (80) forming the additional signal $\bar{u}$ from the rail signal u whose structure corresponds essentially to that of the observer (60), except that the first summation member (31) is eliminated, that the first backfeed signal is directly feedable to the first integrator (53) and that the rail signal u is feedable to the third summation member (52), this in addition to the output signal of the second integrator (54) which also represents the additional signal $\bar{u}$.

* * * * *